United States Patent
Jacoway

(10) Patent No.: US 8,616,229 B2
(45) Date of Patent: Dec. 31, 2013

(54) WATER STOP VALVE DEVICE WITH ROUGH-IN SLEEVE AND METHOD OF ASSEMBLING THE SAME

(76) Inventor: Michael G. Jacoway, Chattanooga, TN (US)

( * ) Notice: Subject to any disclaimer, the term of this patent is extended or adjusted under 35 U.S.C. 154(b) by 534 days.

(21) Appl. No.: 12/923,360

(22) Filed: Sep. 16, 2010

(65) Prior Publication Data

US 2012/0067436 A1    Mar. 22, 2012

(51) Int. Cl.
 *E03B 1/04* (2006.01)
 *F16L 35/00* (2006.01)

(52) U.S. Cl.
 USPC ...... 137/15.01; 137/360; 137/382; 137/382.5

(58) Field of Classification Search
 USPC .............. 137/359, 360, 375, 377, 382, 382.5, 137/15.01, 315.01; 285/45, 64; 52/34, 35, 52/220.8, DIG. 12
 See application file for complete search history.

(56) References Cited

U.S. PATENT DOCUMENTS

| | | | | |
|---|---|---|---|---|
| 1,982,117 A * | 11/1934 | Murie | | 4/630 |
| 2,762,388 A | 9/1956 | Hall | | |
| 2,808,069 A | 10/1957 | McCurdy | | |
| 3,760,836 A | 9/1973 | Albanese | | |
| 3,985,152 A | 10/1976 | Albanese | | |
| 4,206,779 A | 6/1980 | Sandstrom | | |
| 4,662,389 A | 5/1987 | Igbal | | |
| 4,896,381 A | 1/1990 | Hutto | | |
| 5,469,882 A | 11/1995 | Condon | | |
| 5,524,669 A * | 6/1996 | Trueb et al. | | 137/375 |
| 5,577,530 A | 11/1996 | Condon | | |
| 5,588,681 A | 12/1996 | Parks | | |
| 5,595,212 A | 1/1997 | Warshawsky et al. | | |
| 5,755,247 A | 5/1998 | Condon | | |
| 6,161,568 A | 12/2000 | Dragotta | | |
| 6,276,004 B1 * | 8/2001 | Bertrand et al. | | 4/615 |
| 6,435,206 B1 | 8/2002 | Minnick | | |
| 6,438,771 B1 * | 8/2002 | Donath et al. | | 4/678 |
| 6,913,245 B2 | 7/2005 | Jacoway | | |
| 7,204,267 B1 | 4/2007 | Persico | | |
| 2002/0108328 A1 | 8/2002 | Richardson | | |
| 2003/0106896 A1 * | 6/2003 | West et al. | | 220/210 |
| 2004/0011397 A1 | 1/2004 | Jacoway | | |

* cited by examiner

*Primary Examiner* — John Fox
*Assistant Examiner* — Kevin Murphy
(74) *Attorney, Agent, or Firm* — PARTS LLC; George L. Walton

(57) ABSTRACT

A new and improved water stop valve assembly includes a water stop valve device having an inlet, an outlet, and a valve handle for actuating the water stop valve device between open and closed positions for controlling fluid flow between the inlet and outlet. A rough-in sleeve member having a front face with an off-set opening for slidably receiving and securing it about a portion of the water stop valve device inlet defining a single valve unit to be installed during a rough-in stage of new and remodeling building construction. The water stop valve device having a remaining portion disposed exteriorly of the front face and always within an outer circumference of the rough-in sleeve member to allow a vanity or cabinet and drywall structure to slide over the entire valve unit and always supported and retained about the rough-in sleeve member by a trim ring.

20 Claims, 8 Drawing Sheets

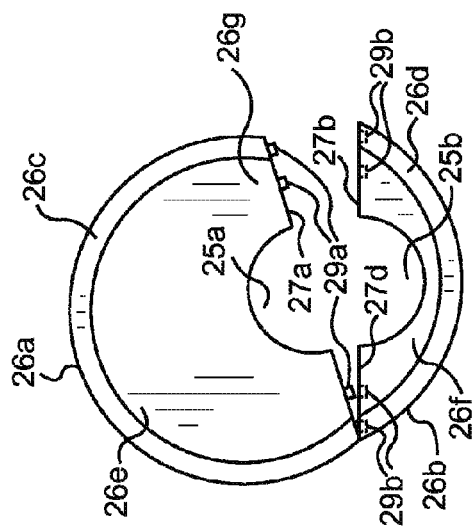
FIG. 7
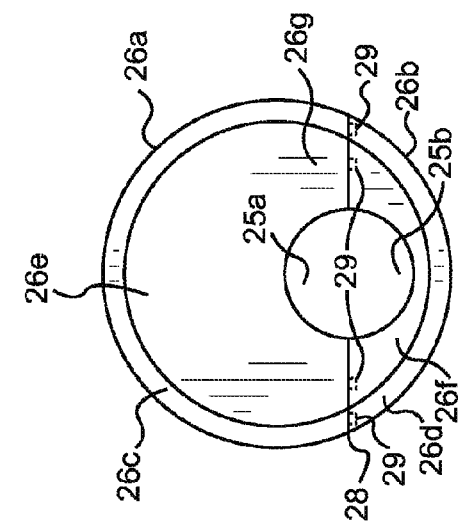
FIG. 8
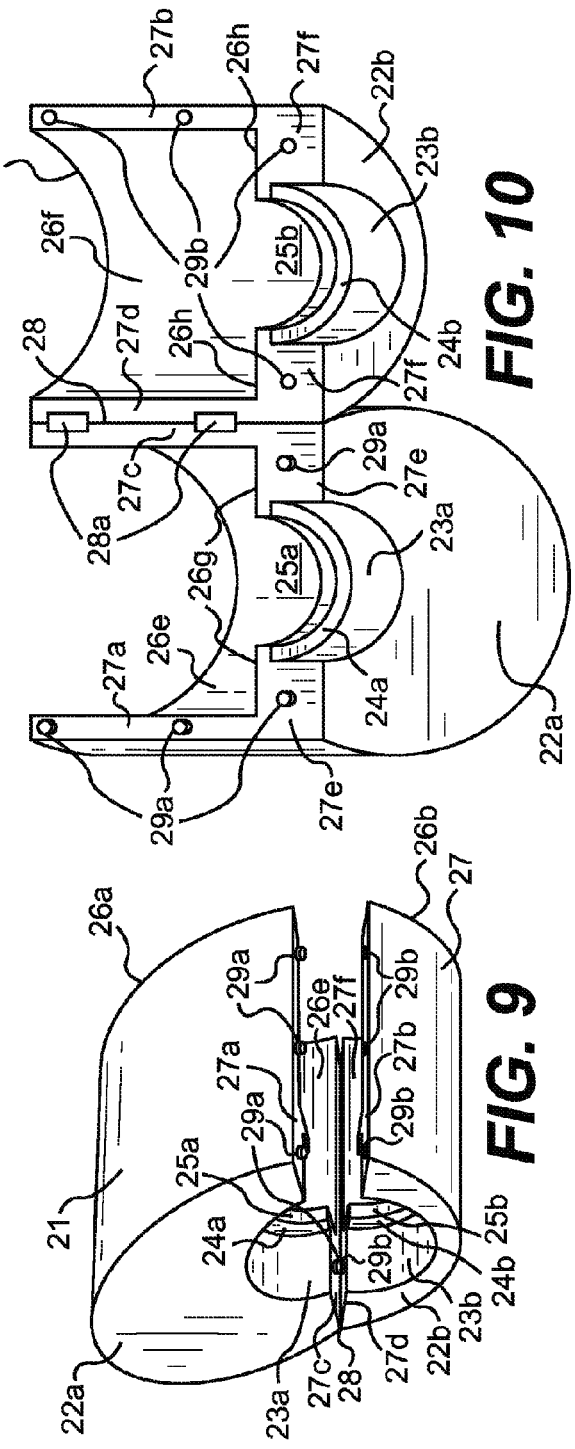
FIG. 9
FIG. 10

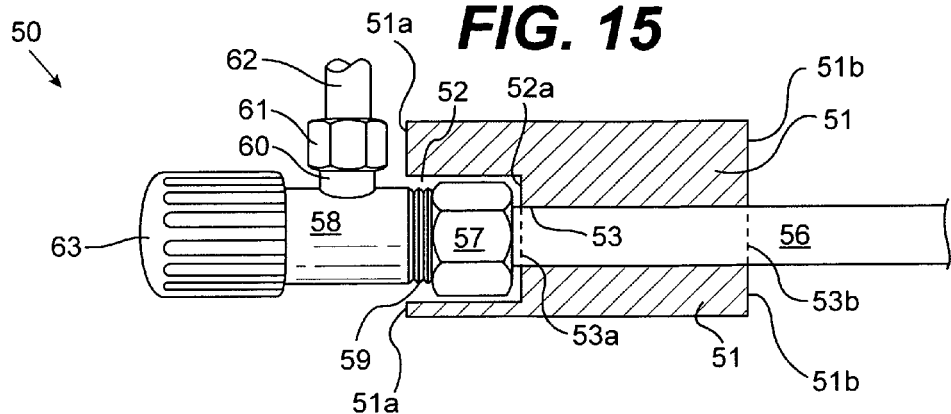
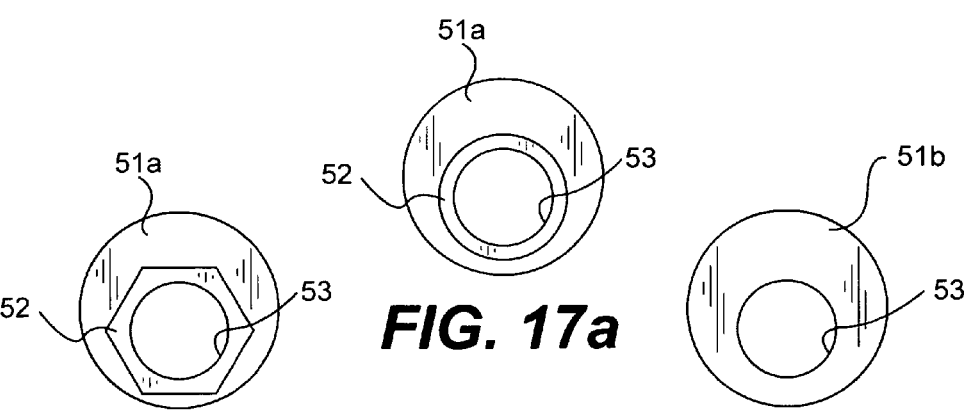

WATER STOP VALVE DEVICE WITH ROUGH-IN SLEEVE AND METHOD OF ASSEMBLING THE SAME

CROSS REFERENCE TO RELATED APPLICATION(S)

Attention is directed to a similar application Ser. No. 10/295,753, filed Nov. 15, 2002, and is now abandoned as of Dec. 22, 2005.

BACKGROUND OF THE INVENTION

1. Field of the Invention

The present invention relates generally to plumbing fixtures water stop valves and more particularly to plumbing fixture water stop valves with rough-in-sleeve members designed to save plumbers considerable time in the installation of all types of plumbing fixtures such as those associated with cabinets, vanities, sinks, toilets, washers and dryers and other water fixtures during the rough-in stage of building constructions, both new and remodeling.

2. Description of the Related Art

Prior art conventional water stop valves used in the plumbing industry are normally not installed until the second trim-out stage and not during the first rough-in stage.

When new building construction, such as housing and commercial building structures, is involved, the building structure is framed, the roof and shingles are installed and the windows and doors are installed. Now the building is in the "dry" which constitutes the rough-in stage. The trim-out is the stage of building constructions after the drywalls, plaster walls or stucco walls and all the utilities have been roughed in, waiting for cabinets, electrical fixtures and plumbing fixtures to be installed so that painters can finish their work.

During this rough-in stage the plumber is called to come in to install all the drains for the toilets, vanities and sinks for bathrooms and kitchens and runs the ¾" copper water pipe lines from the pressure reducing valve and hot water heaters to the bathrooms, kitchens and utility rooms or other areas. These copper lines are run within the walls, basement and crawl spaces with half-inch copper "Ts" or "Ls" (the half-inch pipe and main three quarter-inch water line forms a "T" shaped assembly or a 90 degree copper "L" shaped assembly) every place where a toilet, sink, ice maker, washing machine and all other fixtures requiring water will be placed. The plumber then stubs out the half-inch copper pipe about 6 to 8 inches from the stub wall at every "T" or 90 degree "L" and solders a half-inch copper end cap or piece thereon. There will be one for every toilet and two for every sink to accommodate the hot and cold water fixtures.

When the rough-in plumbing is complete, the plumber will turn on the water to the building structures at the water meter or main water cut-off valve and check for water leaks at each place on the copper pipes that have been soldered through out the entire building structure. After this is done and there are no water leaks, the plumber waits to be called back after the drywalls have been hung and bathroom vanities and kitchen cabinets have been installed. Once the plumber is called back during the trim-out stage, it is then that the plumber will shut-off water at the main water cut-off valve for the entire building structure and drain all pipes for setting the toilets, installing faucets, water stop valves, tub fixtures, shower fixtures and exterior water faucets or hydrants. The plumber will then go to each "T" or 90 degree "L" where there is a half-inch copper line stubbed out of the wall. If the "Ts" or "Ls" are in a vanity, the plumber will get on his or her back and slide into the vanity and cut off the 6 to 8 inch copper stub and make sure it is completely dry. Then the plumber will solder the water stop valve on the hot and cold water copper pipe lines for each vanity, kitchen sink, bathroom sinks or basins and pedestal type sink or basin. Next, the plumber will cut off the 6 to 8 inch copper stub for each toilet and make sure each is completely dry. Then the plumber will solder or weld a water stop valve to the copper pipe line for each toilet. After this, the plumber will install the water supply lines to the fixtures. Most of this work is performed in cramped areas within a vanity or cabinet and is very inconvenient, burdensome, and time consuming.

After all fixtures are in place, the plumber cuts the water back on for the entire building structures so the copper pipe lines can be checked for water leaks. If there are no leaks the plumber is finally finished (a lot of time spent).

Note that the drywall, cabinet and vanity installers have to cut a large hole in the drywall and the back of the vanities and the cabinets to accommodate the water stop valves. This is very inconvenient and is not esthetically pleasing for the drywalls, cabinets and vanities to have such large holes with the water stop valves disposed there through with large gaps being exposed. Such large gaps allow pests, such as insects and rodents, and unwanted cold air and hot air to come through during the winter and summer months.

Various types of water stop or under fixture valves are well known prior art devices. These types of under fixture stop valves are shown in U.S. Pat. Nos. 3,760,836 and 3,985,152. Another type of water stop valve described as an inline shut-off valve assembly is shown in U.S. Pat. No. 6,913,245. Also, a water stop valve device that is connected to a sub-out line with an adapter plate and dish member is shown in U.S. Pat. No. 5,755,247.

Therefore it is to be understood that the current plumbing rough-in and trim-out system causes the plumber to make multiple trips to a building construction site during the installation of the copper water pipes, stubs, fixture water lines, drains, "T" or "L" pipe fittings, water stop valves, and the cutting off of pipe stubs. Also, the multiple cutting on and off of the main water to check for water leaks, the drying of the pipe lines and the soldering of the water stop valves, and the attaching and removal of valve handles from the water stop valve stems takes considerable time, very burdensome and inconvenient. Note that a plumber bids a job based on the number of drops (drains) plus materials and not based on the number of hours on the job.

It is understood that remodeling constructions also follows the same two stage process as discussed above, that is, the rough-in stage and then coming back later for the trim-out stage.

Although these prior art water stop or under fixture valve devices might be creative, and well-thought-out inventions that function well for their intended purposes at the time of their creation, but they do not teach a rough-in-sleeve member with an off-centered or off-set hole relative to a central axis thereof for receiving a water stop valve device with a pipe extension member there through to be attached to a stub out "T or "L" fitting as a unit. Note that the rough-in sleeve member can easily slide along and over the water stop valve devices with the entire water stop valve disposed and secured within the outer circumference of the rough-in sleeve member, which is a direct result of the above stated off-centered hole of the rough-in sleeve member. As discussed above, the prior art water stop or under fixture valves as they are installed today, that is, during the rough-in and trim-out stages are very time consuming, burdensome and inconvenient.

SUMMARY OF THE INVENTION

The present invention illustrates a new and improved water stop valve device with a generally solid cylindrical rough-in sleeve member with an off-set opening or hole there through relative to a central axis thereof. The cylindrical rough-in sleeve member has a diameter of at least 2¼ inch with the stop valve device measuring at least 2 inches from top to bottom so that the entire water stop valve device is always within the diameter or outer circumference of the cylindrical rough-in sleeve member and never extend there beyond. The off-set opening extending from a front face defines a first diameter with wall portion with a selected depth for receiving a rear end portion of the water stop valve device. Extending from the wall portion is a second smaller opening extending through the cylindrical rough-in sleeve member for receiving an inlet pipe member having one end attached to the water stop valve device and the other end being attached to a "T" or "L" fitting of a main water distribution supply pipeline.

In accordance to the present invention, the new and improved water stop valve device comprises a valve body or housing with a top screw end portion for receiving a packing or stem seal nut, a bottom screw end portion for receiving a nut member on one end of the inlet pipe member with the other end secured or attached to the T" or "L" fitting of the main water line and a water pipe stub passage or outlet that extends at a right angle from one side of the valve body or housing with a threaded end portion for removably receiving a nut member of an inlet water pipe or hose member that is removably attached to the inlet of water fixtures or devices, such as a toilet, sink, ice maker, washing machine and all other fixtures requiring hot and/or cold supply. Interiorly of the valve body or housing is a valve member with a valve stem having one end that extends through the packing or stem seal nut and with the other end of the valve stem being attached to the valve member.

The valve member is moved against and away from a valve seat element that is securely disposed within the interior of the valve body or housing for controlling water flow out of the water pipe stub passage or outlet to the aforementioned water fixtures or devices. Also, the one end of the valve stem has a screw opening disposed within a top surface thereof with a plurality of projections or ribs and grooves or channels disposed about the one end defining a first spline connection means.

Further, the new and improved stop valve device further comprises a valve handle with a screw opening through a center portion thereof, a socket extension member on a back side of the valve handle with a plurality projections or ribs and grooves or channels disposed therein defining a second spline connection means and a screw element. Note that the valve handle socket member is inserted over the valve stem's one end and aligning the projections or ribs and grooves or channels of the valve handle socket member with the projections or ribs and grooves or channels of the valve stem. When the projections or ribs and grooves or channels of the valve stem are fully inserted and aligned within the projections or ribs and grooves or channels of the valve handle socket member, then the screw opening of the valve stem and the screw opening of the valve handle are aligned with one another so that the screw element can be removably screwed through the screw openings for securely attaching the valve handle to valve stem.

After the handle is securely attached, then a user can rotate the handle so that water flow can be controlled through the improved stop valve device. This rotation allows the valve member to be moved between open and closed positions for controlling the water flow through the water stub outlet passage or outlet to the inlet of the above discussed water fixtures or devices.

Alternatively, the valve handle may be screwed directly to the valve stem by screwing the screw element through the openings of the valve stem and the valve handle, without the use of incorporating the valve handle socket with the aforementioned second spline connection means and the aforementioned first spline connection means disposed about the top end of the valve stem. It is well known that the valve member may move away from and against the valve seat by reciprocating or translating, rotating, pivoting or any combination thereof for controlling water flow through the water stub outlet passage or outlet to the inlet of the water fixtures or devices.

Additionally, the new and improved stop valve device further includes a trim ring that is slidably received along an outer surface of the rough-in sleeve member to hide any imperfections in a drywall hole that have been cut in a sheet of drywall after the sheet of drywall has been slidably received along and over the improved stop valve device and the rough-in sleeve member via the drywall hole.

In the "Background of the Invention", the old way of doing rough-in and trim-out plumbing stages of building constructions, both new and remodeling has been described. Now, the new way of doing rough-in and trim-out plumbing stages of building constructions, both new and remodeling will now be discussed.

As with the old way of doing rough-in and trim-out plumbing stages of building constructions, both new and remodeling, a plumber comes in at the rough-in stage and installs all the drains for the toilets, vanities, sinks (bathrooms and kitchens) and utility areas. The plumber will then run ¾" copper lines from pressure reducing valves and hot water heaters to the bathrooms, kitchens and utility areas. These copper lines are ran within the walls, basement and crawl spaces with half-inch copper "Ts" or "Ls" (the half-inch pipe and main three quarter-inch water line forms a "T" shaped assembly or a 90 degree copper "L" shaped assembly) every place where a toilet, sink, ice maker, washing machine and all other fixtures requiring water will be placed. The plumber then stubs out the half-inch copper pipe about 6 to 8 inches from the stub wall at every "T" or 90 degree "L" and solders or welds a half-inch copper end cap or piece thereon. There will be one for every toilet and two for every sink to accommodate the hot and cold water fixtures.

In accordance to another aspect of the present invention, the new way of plumbing will now be described below. As the new and improved water stop valve devices are installed during the rough-in stage of a plumber's job, the plumber will solder the new and improved water stop valve devices at each valve "Ts" or "Ls". After the new and improved water stop valve devices have been soldered to all the "Ts" or "Ls", the plumber will cut the water on to check for leaks. This allows carpenters or others to be able to get water any time they need it by turning the water on at any one of the new and improved water stop valve devices, which is one of the many novel features of the present invention. The plumber will wait to be called back to the building construction sites after the drywalls, plaster or stucco walls and vanities or cabinets have been installed.

The day before the drywalls (which will be referenced from this point on) are hung, the rough-in sleeve members are slidably received on at least a portion of each new and improved water stop valve devices. This doesn't have to be done by the plumber, but instead it can be done by a drywall hanger or a carpenter. The rough-in sleeve members will act as a guide for the drywalls. Then the drywall hanger will cut a 2¼" hole in each piece of drywall that will allow each piece of drywall to easily slide over the entire new and improved water stop valve devices and the rough-in sleeve members. Next, the plumber returns for the trim-out stage of his job to set the toilets, install water faucets, tub and shower fixtures and exterior water faucets or hydrants. The plumber doesn't need to cut the water off at the main water meter or supply, since the new and improved water stop valve devices are already attached and in the water cut-off position. There is no need for plumbers to lay on their backs to cut off the end sections of copper stub outs, dry the copper pipe lines and solder or weld the water stop valve devices thereon, since the water stop valve devices are already attached. Now, plumbers simply go to each new and improved water stop valve devices and install the water supply lines to the water fixtures and his job is complete. Therefore, there is no need for the plumbers to install the trim rings; they can be installed by the carpenters after all of the painting has been done.

The improved valve stop valve devices fit perfectly within the outer circumference of the rough-in sleeve members, thereby allowing each piece of drywall to slide effortless across each rough-in sleeve without any interference defining another one of the many novel features of the present invention. For example, if the aforementioned through hole or opening of the rough-in sleeve member was not off-center or off-set from the central axis thereof, it would not work, because the valve body or housing would extend beyond the outer circumference of the rough-in sleeve member and not allow the rough-in sleeve to slide over at least a portion of the new and improved water stop valve device. Also, the drywall would never be able to slide over the entire new and improved valve stop device and the rough-in sleeve member if the hole in the rough-in sleeve member was not off-set from the central axis of the rough-in sleeve member.

To further demonstrate the significance of the off-center or off-set hole or opening, one can take off the valve handle and look directly from that end of the new and improved valve stop device and see that it lines entirely within the rough-in sleeve member. For example, if you took an empty toilet paper roll, representing the trim ring, and slid it over the new and improved valve stop device and the rough-in sleeve member in the same fashion as a piece of drywall or a vanity or cabinet back side, it will slide perfectly thereon with out any interference with the new and improved valve stop device and the rough-in sleeve member.

A method is provided for quickly and easily assembling a water distribution supply pipeline assembly and attaching water fixtures thereto without post installations of water stop valve devices, re-sweating blocking end caps or turning a main water supply on and off numerous times. The water distribution supply pipeline assembly comprises the steps of providing a "T" or "L" fitting at a main water distribution supply pipeline with a water supply copper pipe having one end being attached to the "T" or "L" fitting, and the other end being attached to an inlet end of the water stop valve device as a unit during the rough-in stage. Next, rotating a valve handle to a closed position in order to shut-off water flow through the inlet end of the water stop valve device to an outlet thereof. Once this step has been performed, the main water supply is activated so that the main water supply pipeline is pressurized. Then the valve handle is rotated to allow water flow to pass through the inlet end to the outlet of the water stop valve device to check for leaks to finalize the rough-in stage.

The next step establishes the beginning of the trim-out stage by first removing the valve handle, then cutting a hole in a piece of drywall material by drywall hangers having a diameter approximately equal to the diameter of the cylindrical rough-in sleeve member, and then sliding the piece of drywall material via the cut hole therein along the outer circumference of the rough-in sleeve member to provide an interior wall for enclosing the water distribution supply pipeline assembly therein. At this point, after the drywall hangers finish hanging the interior drywall, then the carpenters can install vanities and cabinets and cutting holes therein having a diameter approximately equal to the diameter of the cylindrical rough-in sleeve member for sliding them there upon and against the interior drywall.

Then, floor installers can finish their jobs and next the painters can finish their jobs before the plumber is called to come back. Next, the plumber is called back to install a water fixture or an appliance at a location near the cut hole of the interior drywall to be connected to the water outlet of the water stop valve device. This connection is established by connecting one end of a water line or hose to the water outlet of the water stop valve device and the other end connected to the water fixture or appliance for establishing water flow thereto. After the water line or hose has been connected, the final sequence of steps are as follows: the valve handle is re-attached to the water stop valve device unit and thereafter, the valve handle is rotated to actuate the water stop valve unit to allow water flow to the water fixture or appliance to check for any water leaks. Then, if there is no water leaks, water flow may be permanently established to the water fixture or appliance by controlling water flow through the new and improved water stop valve device by selective actuation of the valve handle. Finally, the trim-out stage for the plumber is now complete and thereafter, the carpenters and painters may come back for any touch-up jobs.

During the final step, trim rings are slidably received and secured on the water stop valve devices and the rough-in sleeve member units and abutting against an interior back wall of a vanity or cabinet to hide any imperfections in the cut hole in the vanity or cabinet back wall and the cut hole in the drywall. At this point, there is no need for plumbers to install the trim rings about the water stop valve device and the rough-in sleeve member units, because they can be easily installed by the carpenters after all of the painting has been done.

Note that during the above assembly steps the plumbers never have to come back numerous times and lie on their backs in tight or cramped spaces underneath vanities or cabinets, basement utility areas and crawl spaces to dry and re-sweat, solder or weld pipe joints and install water stop valve devices thereto. This is also one of the many novel features of the present invention.

It is noted in the plumbing industry that many of the water lines or pipes are made from copper, preferably ¾" to ½". In addition, to one of ordinary skill in the art, the water lines or pipes can also be selected from any one of the groups that consist of cross-linked polyethylene (PEX), aluminum plastic composite (APC), corrugated stainless steel tubing (CSST), polyvinyl chloride (PVC) or chlorinated polyvinyl chloride (CPVC). The water pipes selected from either one or any combination of these different types of material can provide many benefits relating to the environment, types of use, flexibility, temperature, and cost and labor savings to name just a few.

Other features, advantages and benefits of the new and improved water stop valve device of the present invention will become apparent to those of ordinary skill in the art upon reading and obtaining a fuller understanding of the following detailed description made in connection with the accompanying drawings.

BRIEF DESCRIPTION OF THE DRAWINGS

A preferred embodiment of the present invention is explained in detail herein below with reference to accompanying drawings, in which:

FIG. 7 illustrates a rear closed view of the rough-in sleeve member according to the second embodiment of the present invention as shown in FIG. 4.

FIG. 8 illustrates a rear open view of the rough-in sleeve member according to the second embodiment of the present invention as shown in FIG. 4.

FIG. 9 illustrates an isometric open view of the rough-in sleeve member according to the second embodiment of the present invention as shown in FIG. 4.

FIG. 10 illustrates a fully open view of the two-halved rough-in sleeve member with a pair of hinge members and the plurality of fastening ribs and apertures or cavities according to the second embodiment of the present invention as shown in FIG. 4.

FIG. 15 illustrates a side view of a new and improved water stop valve device with a rough-in sleeve member and a threaded valve inlet water line in accordance to a second preferred embodiment of the present invention.

FIG. 16 illustrates a side view of a new and improved water stop valve device with a rough-in sleeve member and a valve inlet water line secured thereto by welding or soldering in accordance to a third preferred embodiment of the present invention.

FIG. 17 illustrates a front view of the rough-in sleeve member according to the second preferred embodiment of the present invention as shown in FIG. 15.

FIG. 17a illustrates a front view of the rough-in sleeve member according to the third preferred embodiment of the present invention as shown in FIG. 16.

FIG. 18 illustrates a rear view of the rough-in sleeve member according to the second and third embodiments of the present invention as shown in FIGS. 15 and 16.

DETAILED DESCRIPTION

Reference will now be made in detail to the preferred embodiments of the present invention, examples of which are illustrated in the accompanying drawings. While the invention will be described in conjunction with the accompanying drawings, it will be understood that they are not intended to limit the invention to the accompanying drawings. On the contrary, the present invention is intended to cover alternatives, modifications and equivalents, which may be included within the spirit and scope of the invention as defined by the appended claims.

Figure 1:
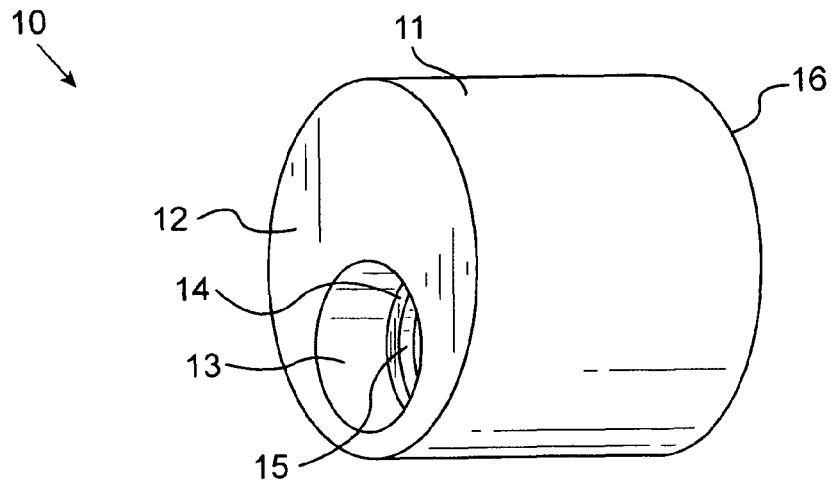
FIG. 1 illustrates an isometric view of a rough-in sleeve member of a new and improved water stop valve device in accordance with the preferred embodiment of the present invention.

FIG. 1 illustrates an overall isometric view of a new and unique solid one-piece rough-in sleeve member 10 of a new and improved water stop valve device 35 (see FIG. 14) of the present invention (will be described and discussed later) for saving cost and time to plumbers during the installation of all types of plumbing fixtures such as those associated with cabinets, vanities, sinks, toilets, washers and dryers and other water fixtures during the rough-in and trim-out stages in building constructions, both new and remodeling. The new and unique rough-in sleeve member 10 includes a cylindrical or circumferential outer surface 11, a front face 12 and an offset or off-center first opening or cavity 13 having a first diameter defining an internal wall rim portion 14. The internal wall rim portion 14 includes a second opening 15 having a second diameter smaller than the first diameter that extends from the first opening 13 to the rear or back end surface 16 (see FIG. 3). It is to be noted that the internal wall rim portion 14 is positioned at a selective depth within the offset first opening or cavity 13.

Figure 2:
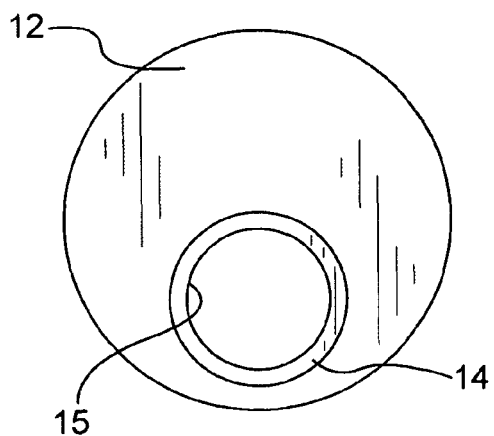
FIG. 2 illustrates a front view of the rough-in sleeve member of the new and improved water stop valve device in accordance with the preferred embodiment of the present invention as shown in FIG. 1.

The rough-in sleeve member 10 of FIG. 2 shows a front view that shows the front face 12, the first diameter opening 13, the back wall rim 14 and the second diameter opening 15.

Figure 3:
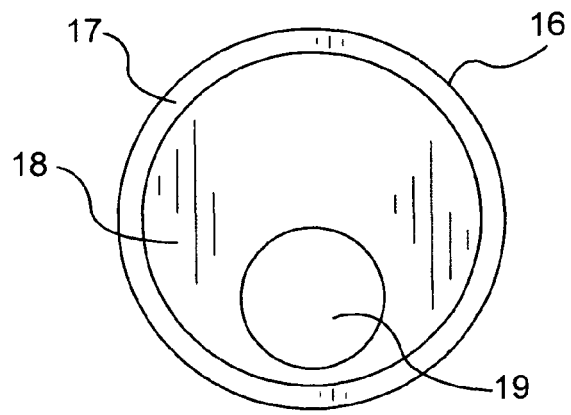
FIG. 3 illustrates a rear view of the rough-in sleeve member according to the preferred embodiment of the present invention.

FIG. 3 illustrates a rear view of the rough-in sleeve member 10 with a rear end 16 and a rear wall rim portion 17. Note that a major interior diameter portion of the rough-in sleeve member 10 defines a cavity 18 that extends from the rear end 16 to a back interior wall surface of the wall rim 14 of the first diameter opening 13. The first diameter opening 13 that extends through the back interior wall surface of the back wall rim 14 to the cavity 18 is represented by element 19. It is to be noted that the cavity 18 represent the majority of the overall circumference of the rough-in sleeve member 10, except for the small thickness of the rear wall rim portion 17.

The rough-in sleeve member 10 has a diameter of at least 2¼" with the total height of the water stop valve device 35 measuring a total height of at least 2" from top to bottom thereof. The minimum diameter of the face of the rough-in sleeve member 10 is preferred to be within 2" to 2¼" diameters. Such minimum diameters will allow the water stop valve device 35 to always fit within the circumference of the diameter of the rough-in sleeve member 10, thereby allowing a piece of drywall to slide effortless across a rough-in sleeve member 10 without any interference and always supported thereon. For example, if the aforementioned first opening 13 of the rough-in sleeve member 10 was not off-center or off-set from the center thereof it would not work, because the valve body or housing would extend beyond the circumference and not allowing the rough-in sleeve member 10 to slide over the entire valve housing or body 36 (see FIG. 14) of the new and improved valve stop device 35. Therefore, the piece of drywall would never be able to slide over the entire water stop valve device 35 and the rough-in sleeve member 10 because the water stop valve device 35 will be positioned outside the circumference of the rough-in sleeve member 10.

Figure 4:
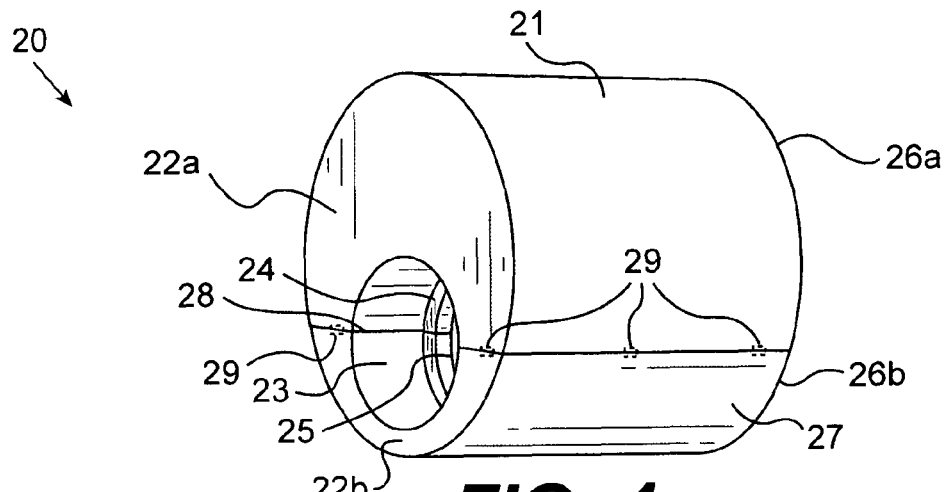
FIG. 4 illustrates an isometric view of a second embodiment of a hinged rough-in two-halved sleeve member with a plurality of snap fastening ribs and apertures or cavities of the new and improved water stop valve device in accordance with the present invention.

FIG. 4 represents an isometric view of a second embodiment of a rough-in sleeve member 10 as a hinged two-halved sleeve member 20 with a plurality of snap fastening means 29 disposed along at least a pair of opposite faces on one side thereof and a hinge means 28 disposed along and between opposite edge faces on the other side of the two-halved sleeve member 20. The hinged in two-halved sleeve member 20 further includes a upper cylindrical portion 21, a lower cylindrical portion 27, an upper half or semi-circular front face 22a, a lower half or semi-circular front face 22b, an upper half or semi-circular rear end portion 26a and a lower half or semi-circular rear end portion 26b. The hinge means 28 includes an integral thin body portion disposed along and between the opposite edge faces that extends from the front half or semi-circular face portions 22a and 22b to the rear end portions 26a and 26b and between the upper cylindrical portion 21 and the lower cylindrical portion 27. An offset first opening or cavity 23 of a first diameter defined by the upper half portion of face 22a and a lower half portion in the lower face 22b. The upper and lower half portions of the offset first opening or cavity 23 of a first diameter defining an internal wall rim portion 24 that is positioned at a selective depth within the off-set first opening or cavity 23. Also, the wall rim portion 24 has a second opening or cavity 25 disposed therein, which is of a diameter smaller than the first opening or cavity 23 and aligned therewith.

Figure 5:
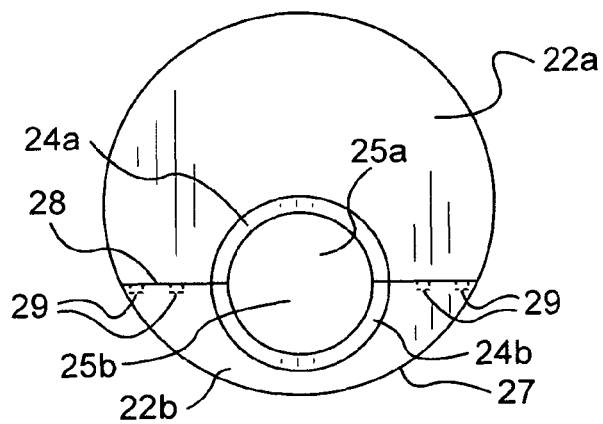
FIG. 5 illustrates a front closed view of the rough-in sleeve member according to the second embodiment of the present invention as shown in FIG. 4.

Now referring to FIG. 5, which is merely a front view of FIG. 4 that will be further described. FIG. 5 shows a closed hinged position of the hinged rough-in two-halved sleeve member 20 with the plurality of snap fastening means 29 securing the rough-in two-halved sleeve member 20 in the closed hinged position. Furthermore, the wall rim portion 24 includes an upper internal wall rim portion 24a and a lower internal wall rim portion 24b. The upper and lower internal wall rim portions 24a and 24b define the second diameter opening 25 with complimentary half or semi-circular upper portion 25a and half or semi-circular lower portion 25b that are hinged between closed and open positions. The same elements that are shown in FIG. 5 that are shown and described in FIG. 4 above will not be further described in order to obviate redundancy.

Figure 6:
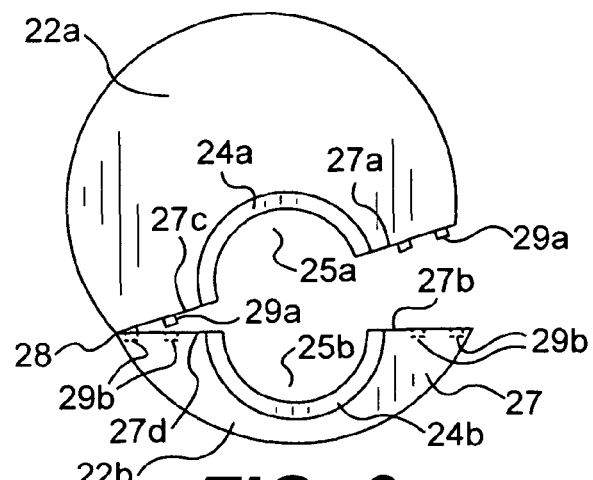
FIG. 6 illustrates a front open view of the rough-in sleeve member according to the second embodiment of the present invention as shown in FIG. 4.

FIG. 6 is very similar to FIG. 5, except that it shows a front open view of the hinged rough-in two-halved sleeve member 20 with the plurality of snap fastening means 29 being unsnapped so that the rough-in two-halved sleeve member 20 is in the open hinged position that would allow a user or plumber to slide it along and over a water stop valve device 35. This will be discussed in greater details in later Figures. In this hinged open position, only the elements that have not been previously discussed in FIG. 4 and FIG. 5 will now be described. The difference between FIG. 6 and FIG. 5 is that the two-halved sleeve member 20 has been pivoted away from one another to the open position.

This pivotal movement allows the plurality of snap fastening means 29 to become unsnapped. The fastening means 29 includes a plurality of fastening ribs or projections 29a along an edge of an upper underneath front surface 27a and along a front edge of an upper underneath back surface 27c adjacent the hinge portion 28 of the upper cylindrical portion 21 and a plurality of fastening holes or apertures 29b that are positioned along an edge of a front top surface 29b of the lower cylindrical portion 27 and along a front edge of a back top surface 27d adjacent the hinge portion 28 of the upper cylindrical portion 21. In the unsnapped position, the plurality of fastening ribs or projections 29a has been moved out of engagement with the plurality of fastening holes or apertures 29b to the aforementioned hinged open position. Such open position allows the first off-set opening 23 to be separated into a half or semi-circular upper opening portion 23a and a half or semi-circular lower opening portion 23b. Also, this open position will allow the second off-set opening 25 to be separated into a half or semi-circular upper opening portion 25a and a half or semi-circular lower opening portion 25b. As a result of this open position, the rough-in sleeve member 20 may be easily positioned about at least a portion of a water stop valve device 35 during a building construction rough-in stage.

Referring now to FIG. 7, which is a rear closed view of the rough-in sleeve member 20 as shown in FIG. 5. The outer periphery rear end has an upper semi-circular section 26a and a lower semi-circular section 26b of the rough-in sleeve member 20. The rear end semi-circular sections 26a and 26b includes an upper semi-circular outer peripheral rim wall portion 26c, a lower semi-circular outer peripheral rim wall portion 26d, an upper rear semi-circular cavity section 26e, a lower rear semi-circular cavity section 26f, an upper offset semi-circular opening portion 25a and a lower offset semi-circular opening portion 25b. The upper and lower semi-circular cavity sections 26e and 26f extends from the rear ends 26a and 26b to back wall surfaces 26g and 26h of the semi-circular upper and lower internal wall rim portions 24a and 24b, respectively, defining the second diameter off-set opening 25 with the complimentary semi-circular upper opening portion 25a and the semi-circular lower opening portion 25b that are hinged and snap-fitted in a closed position by the fastening means 29.

FIG. 8 a rear view that is very similar to FIG. 7, except that the rough-in sleeve member 20 is now in the open position to allow it to be inserted about at least a portion of a water stop valve device 35. Note that the elements discussed above in FIGS. 5-7 that are the same in FIG. 8 will not be discussed again to obviate redundancy. In the open position of FIG. 8, the plurality of fastening ribs or projections 29a has been unsnapped and moved out of engagement with the plurality of fastening holes or apertures 29b in the same as described previously in FIG. 6 above.

FIG. 9 is an isometric open view arrangement of FIG. 4. Since most of the elements referenced in FIG. 9 are the same as the described referenced elements of FIGS. 4-8, they will not be repeated. However, FIG. 9 show the plurality of fastening ribs 29a being selectively spaced along the upper front edge surface 27a and the plurality of fastening holes or apertures 29b are selectively spaced along the lower front edge surface 27b. Also, the plurality of fastening ribs 29 and fastening holes or apertures 29b are shown only to be disposed at the front back edge surface adjacent the hinge portion 28. Optionally, the plurality of fastening ribs 29a and fastening holes or apertures 29b can be represented by any number disposed along the front edge surfaces 27a, 27b and along the back edge surfaces 27c, 27d adjacent the hinge portion 28. Further, the plurality of fastening ribs 29a and fastening holes or apertures 29b could be merely a single fastening rib 29a and a single fastening hole or aperture 29b selectively positioned on the front edge surfaces 27a, 27b and/or on the back edge surfaces 27c, 27d, if desired.

It is to be noted that the fastening ribs 29a and fastening holes or apertures can take on many designs, shapes and forms and can be a single fastening type means disposed any where on the rough-in sleeve to one of ordinary skill in the art, at the time the invention was made, if desired.

Referring particularly to FIG. 10, the rough-in sleeve member 20 is shown in a fully open or laid-out position. FIG. 10 shows the upper underneath front edge surface 27a and the back underneath edge surface 27c being formed as substantially L-shaped configurations. The upper underneath front edge surface 27a and the back underneath edge surface 27c of the substantially L-shaped configurations are defined as long leg portions that equal the diameter of the rear upper semi-circular rim portion 26c that extends to short perpendicular leg portions 27e of a certain thickness, which extends from the front face 22a to the internal back wall surfaces 26g of the upper internal cavity portion 26e. These short leg portions 27e define the diameter of the upper off-set semi-circular opening portion 25a and the upper semi-circular internal wall rim portion 24a. The semi-circular opening portion 25a that extends through the internal wall rim portion 24a and into the upper internal cavity portion 26e is slightly smaller than the major offset semi-circular opening portion 23a extending between the front face 22a and the front of the internal wall rim portion 24a.

The lower top front edge surface 27b and the back top edge surface 27d are formed as substantially L-shaped configurations having long leg portions that equal the diameter of the rear lower semi-circular rim portion 26d, which extends to short perpendicular leg portions of a certain thickness that extends from the lower front face 22b to the internal back wall surfaces 26h of the lower internal cavity portion 26f. These short leg portions define the diameters of the lower off-set semi-circular opening portion 25b and the lower semi-circular internal wall rim portion 24b. The semi-circular opening portion 25b that extends through the internal wall rim portion 24b and into the upper internal cavity portion 26f is slightly smaller than the major off-set semi-circular opening portion 23b extending between the front face 22b and the front of the internal wall rim portion 24b.

FIG. 10 further illustrates a second optional type of the preferred hinge means 28 that includes at least a pair of spaced apart hinge members 28a being removably attached between the long leg portions of elements 27c and 27d to allow the semi-circular rough-in sleeve portions 21 and 27 to pivot from a closed position to an open position to slidably receive at least a portion of a water stop valve device 35 therein during a rough-in building construction stage. Note that the hinge members 28a can take on many different types of well known hinge members with different shapes, designs and materials, which would not in any way change the claimed inventive concept.

Figure 11:
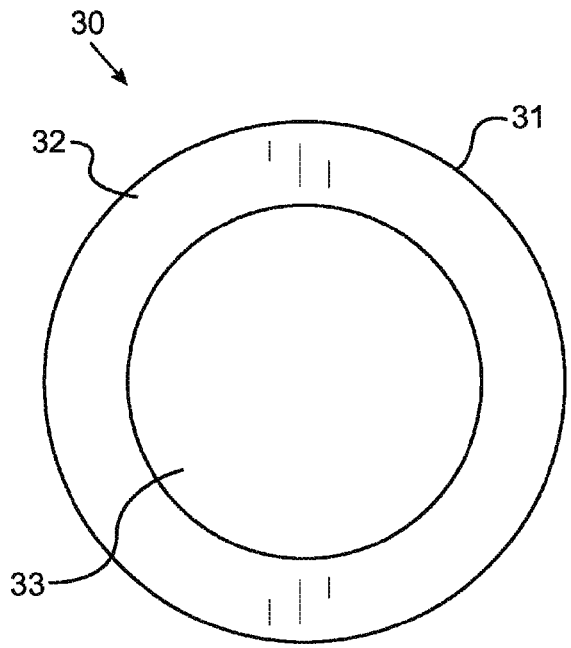
FIG. 11 illustrates a front view of a trim ring according to the preferred embodiment of the present invention.

Turning now to FIG. 11, this illustration shows a front view of a trim ring 30. The trim ring 30 includes a front face 32 with a central opening 33 that is slightly larger than the diameter of the rough-in sleeve member 10 or 20 so that either sleeve member 10 or 20 can slide there along for hiding imperfections in a cut hole of a piece of drywall and a cut hole in a vanity or cabinet.

Figure 12:
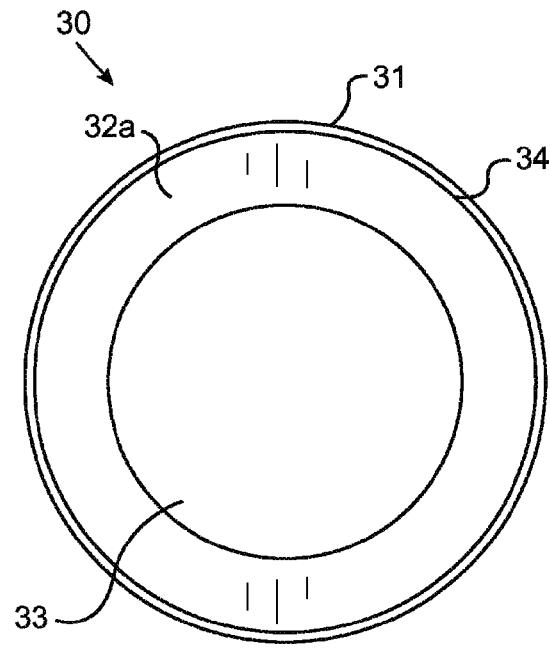
FIG. 12 illustrates a rear view of the trim ring according to the preferred embodiment of the present invention as shown in FIG. 11.

FIG. 12 illustrates a rear view of the trim-ring device as shown in FIG. 11. In FIG. 12, the trim ring 30 includes the annular cylindrical surface 31, a back interior wall face 32a opposite the front face 32, a back view of the central opening 33 and an annular rear rim wall edge 34 that extends and spaced from the front face 32 at a distance that defines the diameter of the annular cylindrical surface 31 and the inside depth between the back interior wall face 32a and the rear annular rim wall edge 34. Note that the diameter of the front face 32 and the back wall face 32a is determined by the diameter of the central opening 33.

Figure 13:
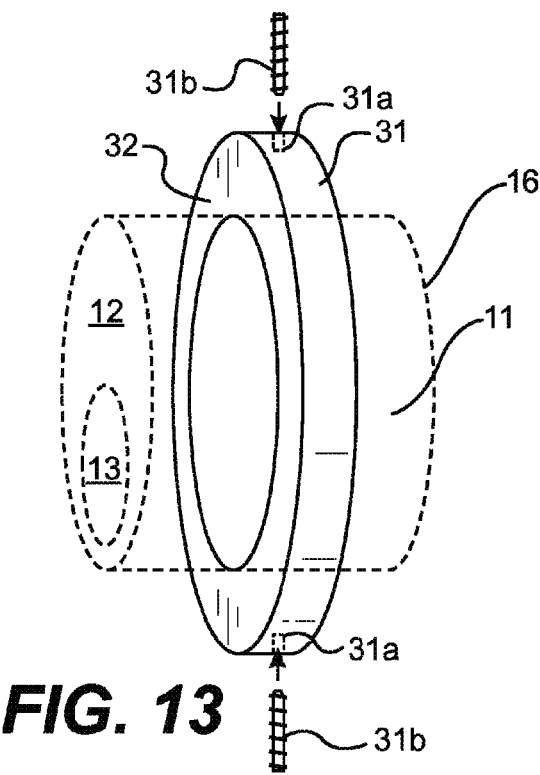
FIG. 13 illustrates an isometric view of the trim ring sliding along an outer circumference of the rough-in sleeve member with at least a pair of set-screw retention cavities for receiving at least a pair of set-screws therein according to the preferred embodiment of the present invention.

With reference to FIG. 13, the trim ring 30 includes an annular cylindrical surface 31 and at least a pair of set-screw retention holes or apertures 31a positioned on and located at a top and bottom portions of the cylindrical surface 31 that opens into an open space between the back interior wall face 32a and the rear annular rim wall edge 34. In dotted lines, a rough-in sleeve 10 for illustration purposes is shown inserted through the central opening 33, which would hide imperfections in a cut hole of a piece of drywall and a cut hole in a vanity or cabinet not shown. The rough-in sleeve member 10 includes a front face 12, an offset opening 13 and a rear end 16, which has been discussed in greater details earlier.

Figure 13A:
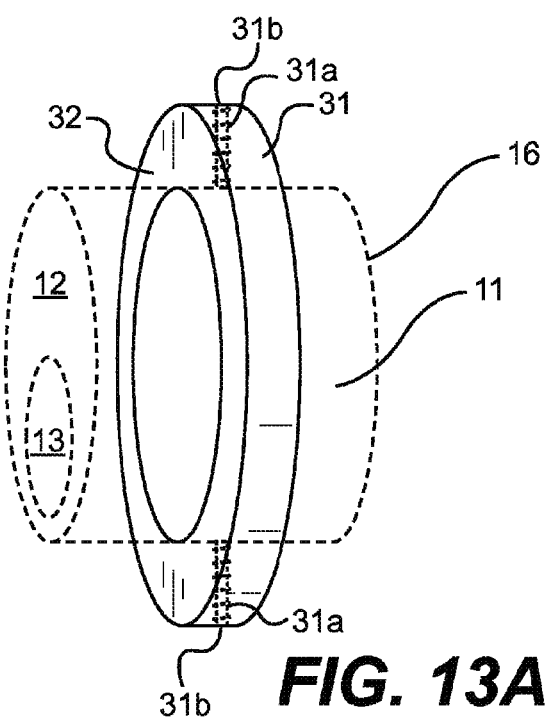
FIG. 13A illustrates an isometric view of the trim ring sliding along the outer circumference of the rough-in sleeve member with the at least a pair of set screws that are screwed within the set screw retention cavities according to the preferred embodiment of the present invention.

In reference to FIG. 13A, the only difference between FIG. 13 and FIG. 13A is that FIG. 13A shows at least a pair of set screws 31b that is screwed into the at least a pair of set-screw retention holes or apertures 31a at the top and bottom portions of the annular cylindrical surface 31 through the open space between the back interior wall face 32a and the rear annular rim wall edge 34 and into a locking engagement with the rough-in sleeve member 10.

Note that the number of set screws 31b that is screwed into the set-screw retention holes or apertures 31a can be less or more than the pair as illustrated in FIGS. 13 and 13A and can be selectively positioned on the annular cylindrical surface 31, if desired.

Figure 14:
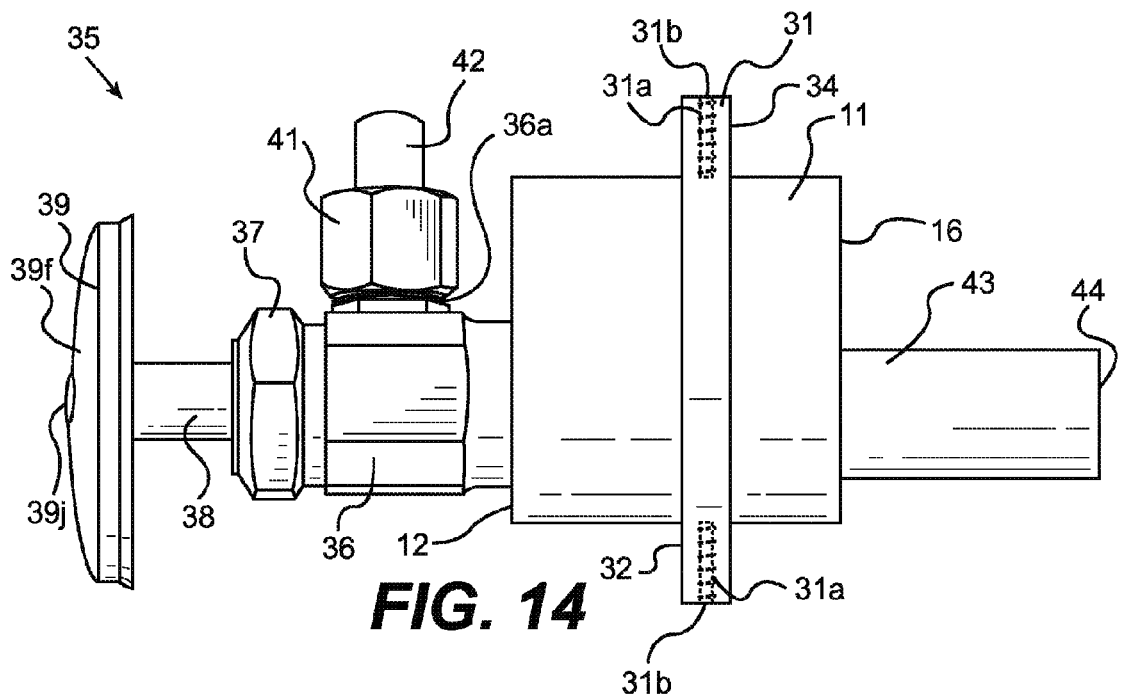
FIG. 14 illustrates a side view of the new and improved water stop valve device with the rough-in sleeve member and the trim ring installed about a portion of the water stop valve device, the trim ring includes the at least a pair of set screw retention cavities that receive the at least a pair of set screws therein for retaining the trim ring about the rough-in sleeve member and a valve handle attached to a valve stem of the water stop valve device as a complete unit according to the preferred embodiment of the present invention.

FIG. 14 shows a side view of the first embodiment of the new and improved water stop valve device 35 having a hexagonal valve body housing 36, a threaded valve outlet 36a, a valve inlet end 36b, a packing nut 37 screwed onto the valve body about a valve stem 38 to prevent leakage, the valve stem 38 is attached to a valve member (not shown) that engages an valve seat member (not shown), a valve handle member 39 with a screw 40 for attaching the valve handle member 39 through a screw opening 39a (see FIG. 14B) to the top of the valve stem 38 through a screw opening 38a (see FIGS. 14A and 14B) and a water outlet hose 42 with a threaded nut 41 that is secured to the valve outlet 36a for supplying water flow to various types of water appliances. Also, the new and improved water stop valve device 35 further includes the previous mentioned rough-in sleeve member 10 including the front face 12, the outer cylindrical surface 11 and the rear end 16 thereon. The previously mentioned trim ring 30 with the annular cylindrical surface 31, the front face 32, the at least a pair of set screw aperture or hole 31a preferably shown disposed at the top and bottom portions of the annular cylindrical surface 31 between the front face 12 and the annular rim wall edge 34 of the trim ring 30. Furthermore, a water supply line 43 having one end attached to the inlet end 36b of the valve housing 36 and the other end 44 is attached to a T-fitting 47 of a main water supply pipeline assembly 46 (see FIG. 14C).

Figure 14A:
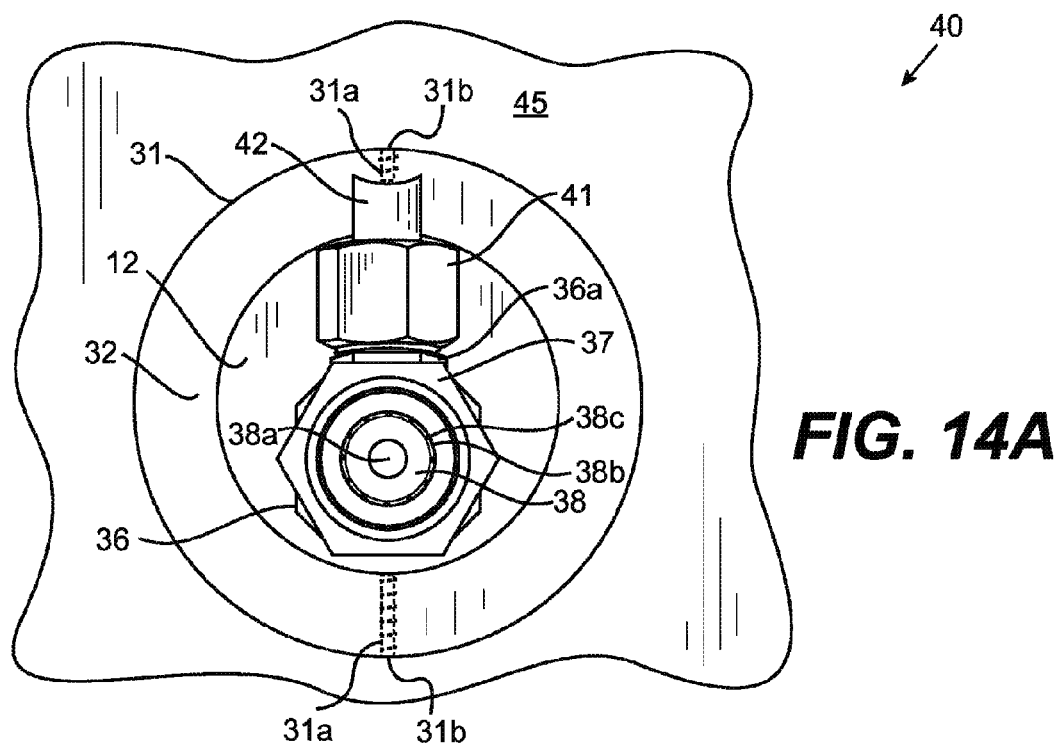
FIG. 14A illustrates a front view of the new and improved water stop valve device with the rough-in sleeve member and the trim ring installed as a unit about at least portion of the water stop valve device, the trim ring being secured about the rough-in sleeve member by the at least a pair of set screws screwed in the at least a pair of set screw retention cavities according to the preferred embodiment of the present invention.

With reference to FIG. 14A, it shows a front view of a combined water stop valve and a wall structure assembly 40. In this Figure, many of the reference numbers discussed above in FIG. 14 will not be repeated. The elements that were not mentioned in FIG. 14 above will now be discussed. In this front view, valve stem 38 shows the central threaded opening 38a in the top portion thereof. Around the top of valve stem 38 there is a spline connection including a plurality of retaining ribs or projections 38b and a plurality of retaining grooves or channels 38c (see FIGS. 14B and 14D) disposed thereon to mutually engage a spline connection including a socket extension member 39c having plurality of retaining ribs or projections 39d and a plurality of complimentary retaining grooves or channels 39e therein (see FIGS. 14A and 14D) and being disposed in a central portion on a rear side surface face 39g of the valve handle 39 about the central screw opening 39a. The retaining ribs or projections 38b of the valve stem 38 allow the valve handle 39 to be centered and aligned correctly thereon prior to the screw 39i being inserted through screw opening 39a and threaded into the valve stem threaded opening 38a to firmly secure the valve handle 39 to the valve stem 38. Also, FIG. 14A shows the rough-in sleeve member 10 that has been slidably installed over at least a portion of the water stop valve device 35, and a sheet of drywall 45a and a vanity or cabinet 45 that have been slidably installed over and along the water stop valve device 35 and the outer cylindrical surface 11 of the rough-in sleeve member 10.

Further in view of FIG. 14A, a carpenter or drywall installer will cut at least 2" to 2¼" hole 45c in a vanity or cabinet back wall 45b and at least a 2" to 2¼" hole 45d in a sheet of drywall 45a so that the rough-in sleeve member 10 and the water stop valve device 35 defining a unit may be easily guided and received through the cut holes 45c and 45d of the vanity or cabinet wall 45 and a drywall 45a, respectively. The cut holes 45c and 45d are shown in FIG. 14C. Then the trim ring 30 can easily slide along and over the rough-in sleeve member 10 through the trim ring opening 33 until it comes into contact with an interior back wall surface portion 45b of the vanity or cabinet 45. Once this happens, the trim ring 30 can be retained in position by screwing at least one of the pair of set screws 31a through at least one of the pair of the set screw retention holes or apertures 31 until it engages the outer cylindrical surface 11 of the rough-in sleeve member 10, while hiding any imperfections in the cut holes 45c and 45d of the vanity or cabinet 45 and the drywall 45a, respectively.

A unique feature of the present invention as mentioned earlier lies in the off-set positioning of the opening 13 or 25 that allows the rough-in sleeve member 10 or 20 to slide easily over the entire water stop valve device 35 with the water supply pipe 43 having one end attached to the water inlet end 36b of the hexagonal valve body housing 36 by various types of securing means or fasteners, such as soldering, welding, screw threads, screw and nut means, clamping means, and other types of mechanical attachment or fastening means, if desired. The other end 44 of the water supply pipe 43 is secured within a first end 47a of a water main "T" fitting by the same previously mentioned securing means or fasteners. Another important feature is that the off-set opening 13 or 25 allows the entire water stop valve device 35 to be disposed within the circumference of the rough-in sleeve member 10 or 20. This is based on the water stop valve device assembly 35 measuring about 2" from top to bottom with the rough-in sleeve member 10 or 20 having a diameter measuring at least 2" to 2¼". It is to be noted that in the plumbing industry that the water supply pipe 43 can preferably be selected of a material such as copper, and of a size that is preferably ¾" to ½". In addition to the copper, the water supply pipe 43 can also be selected of a material from any one of the groups that consist of cross-linked polyethylene (PEX), aluminum plastic composite (APC), corrugated stainless steel tubing (CSST), polyvinyl chloride (PVC), chlorinated polyvinyl chloride (CPVC) or any combination of the groups, if desired. Therefore, the water supply pipe 43 that is selected from these different types of material provide benefits, such as, addressing environmental concerns and cost and labor savings. Furthermore, any of the water lines or pipes associated with this invention can be selected from any one of the groups of material mentioned above.

Figure 14B:
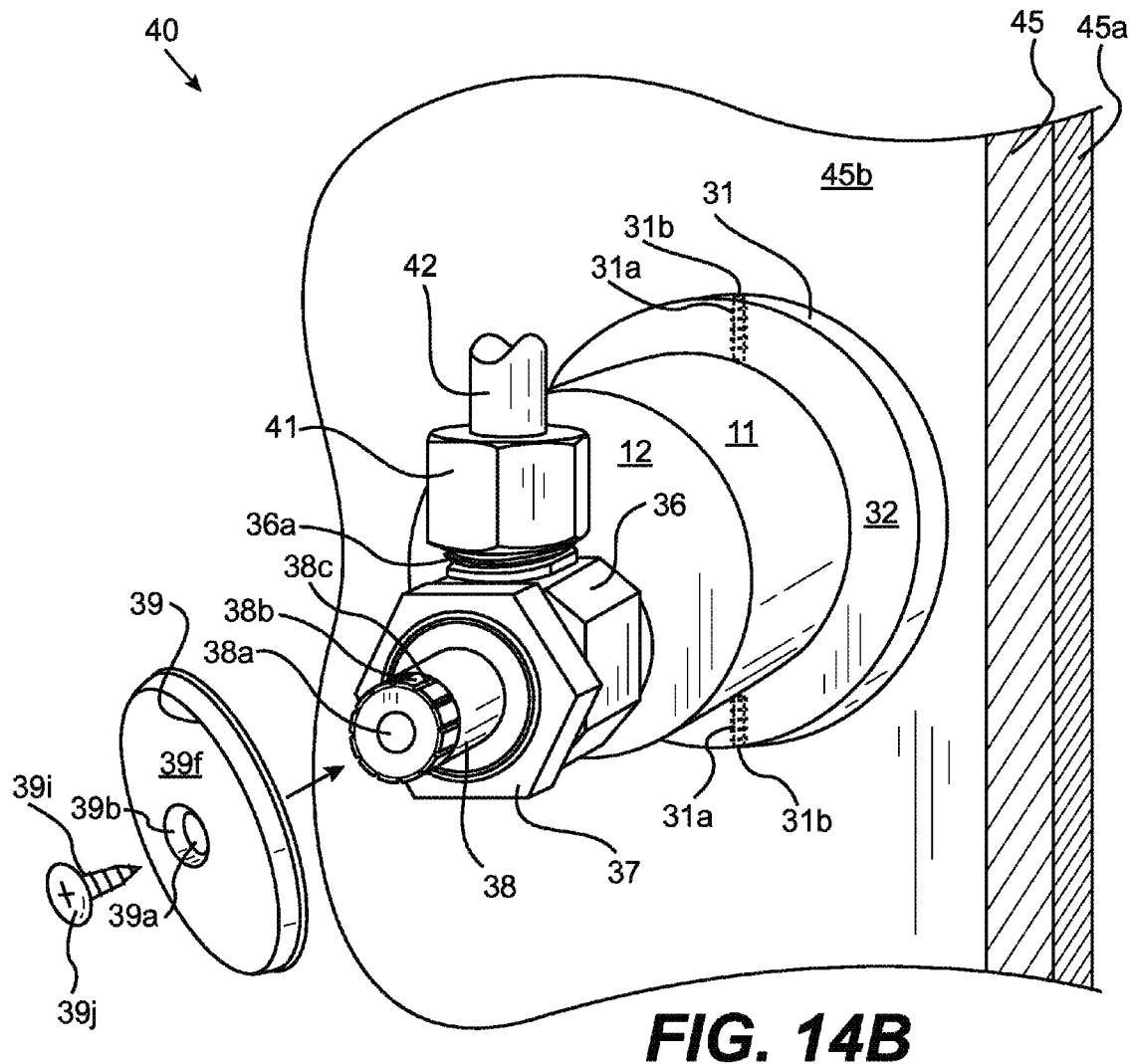
FIG. 14B illustrates an isometric view of the new and improved water stop valve device with a valve stem having a spline connection thereon, the rough-in sleeve member and the trim ring includes the at least a pair of set screw retaining cavities with the at least a pair of set screws screwed therein and being assembled together as a unit with a detachable valve handle that is removably secured to the valve stem spline connection according to the preferred embodiment of the present invention.

Turning now to FIG. 14B, which shows a combined water stop valve and a wall structure assembly 40 that is depicted in an isometric orientation valve handle 39 being shown removably detached from the water stop valve device 35. In this Figure, the rough-in sleeve member 10 is disposed about at least a portion of the water stop valve device 35 and is inserted through the aforementioned hole 45c disposed in the interior back wall surface portion 45b of the vanity or cabinet 45 and the aforementioned hole 45d disposed in the drywall 45a. A trim ring 30 is slidably installed over the water stop valve device 35 and the rough-in sleeve device 10 and into abutting engagement with the interior back wall surface 45b of the vanity or cabinet 45 to hid any imperfections in the holes 45c and 45d of the vanity or cabinet 45 and the drywall 45a, respectively. This trim ring 30 is retained in position by the at least a pair of set screws 31b (as shown in FIG. 13A) into the at least a pair of retaining set-screw holes 31a, preferably disposed at the bottom of the trim ring 30.

Further in view of FIG. 14B, the screw opening 39a has a larger counter bore portion 39b for receiving a screw head 39j of the screw 39i therein. This allows the screw head 39j to sit within the recess portion 39b so that it is flush with or below a front side face surface 39f of the valve handle 39 when the screw 39i is inserted through the screw opening 39a and screwed into the valve stem threaded opening 38a.

Figure 14D:
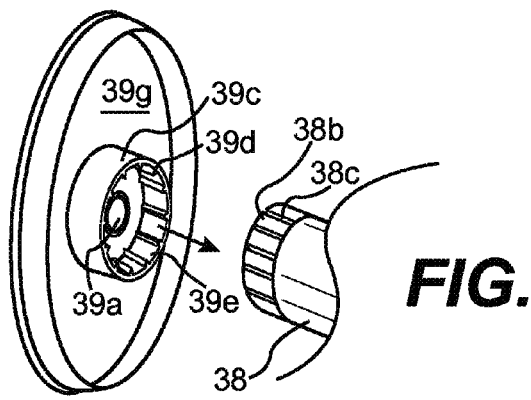
FIG. 14D illustrates an isometric sectional cut view of the spline connection of the new and improved water stop valve device, where the spline connection of the valve stem has a plurality of projections or ribs and a plurality of grooves or channels disposed at a top end thereon and a spline connection on a back side of the valve handle that includes a socket extension member with a plurality of mating projections or ribs and a plurality of grooves or channels therein for aligning and securing the valve handle to the valve stem according to the preferred embodiment of the present invention.
Figure 14C:
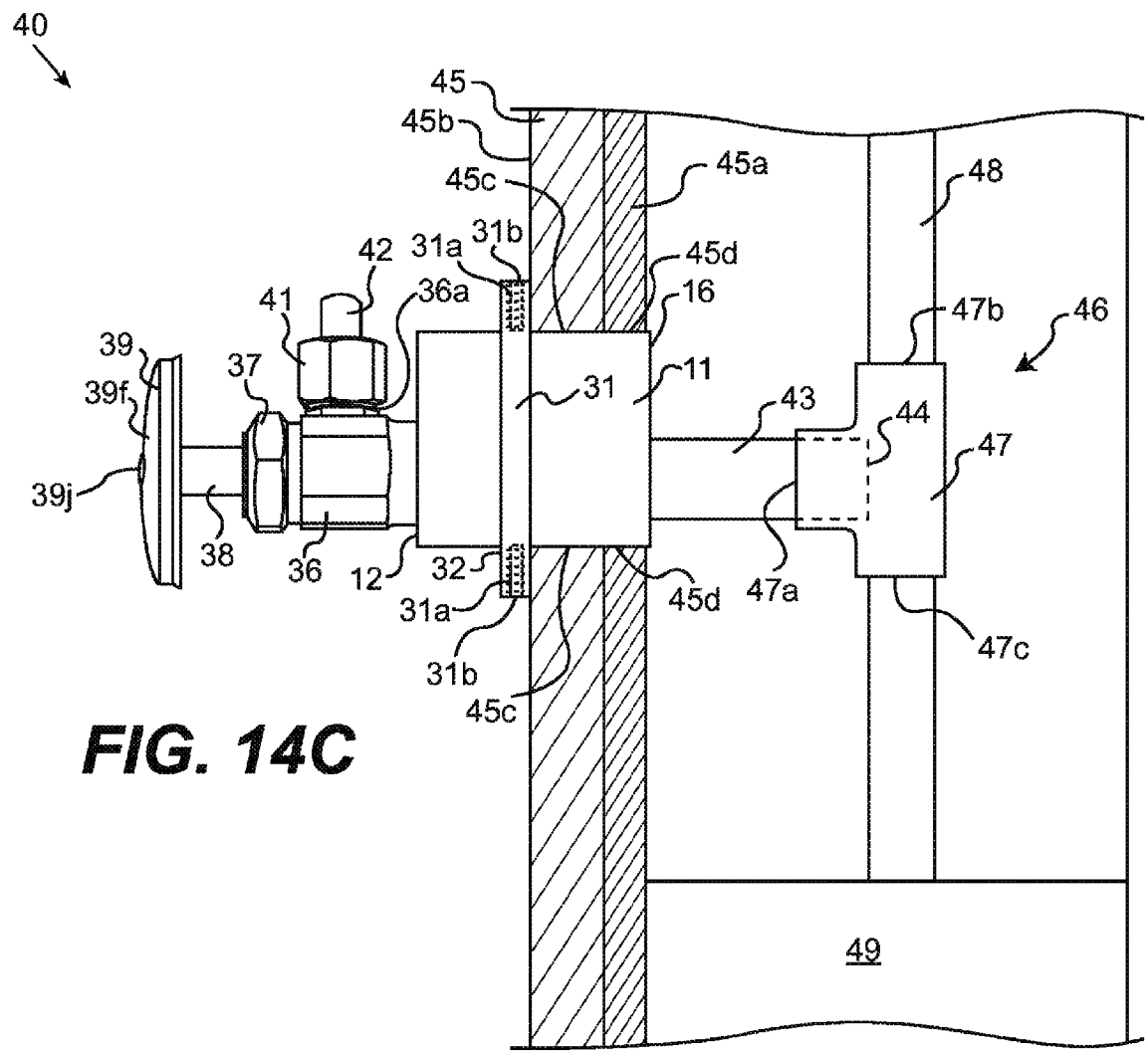
FIG. 14C illustrates a side view of the new and improved water stop valve device that is attached to a main water T-fitting with the rough-in sleeve member disposed about at least a portion of the water stop valve device, the trim ring with the at least a pair of set screw retaining cavities and the at least a pair of set screws screwed therein for retaining the trim ring to the rough-in sleeve member, the valve handle is secured to the valve stem and a drywall is installed over an outer circumference of the rough-in sleeve member with the trim ring retained there against thereby defining a complete unit that is attached to and encloses a water distribution supply pipeline assembly according to the preferred embodiment of the present invention.

FIG. 14D shows an isometric sectional cut view of the valve stem 38 having a top portion with a plurality of ribs or projections 38b and a plurality of grooves or channels 38c defining a first spline connection disposed thereon and a detached valve handle member 39. The valve handle member 39 shows a back or rear surface face side 39g thereof with a socket extension member 39c disposed in a central portion on the rear side surface face 39g about the valve handle central screw opening 39a. The socket extension member 39c includes a plurality of projections or ribs 39d and a plurality of grooves or channels 39e disposed there between defining a second spline connection. The first and second spline connections will properly center and align the valve handle 39 relative to the valve stem 38 prior to the screw 39i being inserted through screw opening 39a and threaded into the valve stem threaded opening 38a to firmly secure the valve handle 39 to the valve stem 38.

Note that the plurality of ribs or projections 38b and the plurality of grooves or channels 38c of the valve stem 38 is received within the socket extension member 39c and mated with the plurality of projections or ribs 39d and the plurality of grooves or channels 39e so that the screw 39i can be inserted through the valve handle central screw opening 39a, through the socket extension member 39c and into the valve stem threaded opening 38a to fixedly secure the valve handle 39 to the valve stem 38.

Referring now to FIG. 14C, this embodiment illustrates a side view of the combined water stop valve and a wall structure assembly 40 with a water distribution supply pipeline assembly 46 of a housing or building structure attached thereto. The water distribution supply pipeline assembly 46 includes a main water line 48 that is provided within a standard stud wall 49. The main water line 48 will be understood to one of ordinary skill in the art, at the time the invention was made, to be attached to other main water lines through out a structure, such as a building, apartment or house and converge at a main water service inlet valve which feeds water to the structure from a metropolitan water line. For example, in a building, apartment or house the main water line 48 is at least a 1¾" pipe that feeds the entire building structure. Note that the main water line 48 may run up through a floor of a second story of the building structure, or it may run through a basement floor or crawl space as well.

Also, the main water line 48 as shown is attached to a "T" fitting through a branch section defining a pair of opposite end openings 47b and 47c that is ran to locations where a fixture such as a toilet, sink, bath tub, spa tub, hot tub or jacuzzi, shower, commode, radiator, garden faucet, laboratory stop valve, ice maker, washing machine and associated cabinets or vanities will be installed. This water line 48 may be attached to the "T" fitting by traditional mechanical securing means such as, joint sweating, threading and soldering or welding about the openings 47b, 47c and the water line 48. The other pipe end 44 of the water supply pipe 43 is secured within the first end 47a of a perpendicular extending branch section that is integrally connected between the end openings 47b and 47c for open communication there through. This open communication allows water or fluid to flow from the end openings 47a and 47b to the one end of the water supply pipe 43 that is attached to the inlet end 36b of the valve housing 36 so that the flow of water or fluid can be controlled through the water stop valve device 35 to the outlet 36a and through the hose 42 with one end connected to the outlet 36a and the other end is connected to the aforementioned various fixtures. In addition to the "T" fitting, an "L" fitting may be used, if desired.

Therefore, according to the following assembly steps, the new and improved water stop valve device 35 is installed to a "T" or "L" fitting located along the main water line 48 during the rough-in stage, which provides a closed system and will allow the water distribution supply pipeline assembly 46 to be pressurized. Following installation of the new and improved water stop valve device 35, the plumber will turn on the main water supply for the building structure and check the water distribution supply pipeline assembly 46 for any leaks. Then, the plumber will turn the valve handle to move the valve member (not shown) within the valve housing body 36 away from its valve seat therein (not shown) to control water flow to locations where any fixture may be installed to check for leaks. This allows carpenters or others to be able to get water any time they need it by turning the water on at any one of the new and improved water stop valve device units 35, 40 during new and remodeling building construction. The plumber will wait to be called back to the building construction sites after the drywall 45a and the vanities or cabinets 45 have been installed.

It is important to know that the old plumbing way would not allow carpenters or others to be able to get water any time they need it by turning the water on at any prior art water stop valve devices during new and remodeling building construction because it is shut off at the main water supply. Note that the availability of water would not happen until after the plumber had been called back during the trim-out stage when the prior art water stop valve devices have been connected to water pipe stub-outs for various water fixtures through out a building structure. Normally, the plumbers have to do this job by lying on their backs or working in tight confine and uncomfortable areas, such as, within or underneath vanities, underneath sinks or basins or crawl spaces, in order to make sure the water line inlet end of the prior art water stop valve devices and the stub-out or "T" fitting ends are dry before these ends are sweated, soldered or welded. After this is done the prior art water stop valve devices are checked for water leaks and the plumbers' jobs have been completed.

In accordance to the present invention, the day before the drywall 45a is hung, the rough-in sleeve member 10 or 20 is slidably received on each new and improved water stop valve device units 35, 40. This doesn't have to be done by the plumber, but instead it can be done by a drywall hanger or a carpenter. The rough-in sleeve members 10, 20 will act as a guide for the drywall 45a. Then, the drywall hanger will cut a 2¼" hole for each piece of drywall 45a that slide over the new and improved water stop valve devices 35, 40 including the rough-in sleeve members 10, 20. Next, the plumber returns for the trim-out stage of his job to set the toilets, install water faucets, tub and shower fixtures and exterior water faucets or hydrants.

Note that during the trim-out stage, the plumber doesn't need to cut the water off at the main water meter or supply, since the new and improved water stop valve devices 35, 40 are already attached and in the water cut-off position. Also, there is no need for plumbers to lay on their backs to cut off the end sections of copper stub outs, dry the pipe lines 43 and sweat or solder the water stop valve devices 35, 40 thereon, since the water stop valve devices 35, 40 are already attached.

Now, plumbers can simply go to each of the new and improved water stop valve devices 35, 40 and install the water supply lines 42 to the water fixtures and their jobs are now complete. Finally, there is no need for the plumbers to come back to just install the trim ring 30. They can be installed by the carpenters after all of the painting has been done. By doing it this way, no paint has to be cleaned off of the trim rings 30.

Referring now to FIG. 15, a second embodiment that shows a cut-away sectional side view of a cylindrical rough-in sleeve member 51 attached to a new and improved water stop valve device 50 defining a combination unit. The new and improved water stop valve device 50 includes a handle or knob member 63 attached to a valve stem and valve member (not shown), a valve body housing 58, a valve seat member (not shown), a threaded water inlet 59 and an inlet water supply pipe 56 with a threaded coupling nut 57 for attaching such to the threaded water inlet 59. Also, the valve body housing includes a water outlet 60 attached to a water supply pipe or hose 62 that can be attached to various types of water fixtures or appliances.

The rough-in sleeve member 51 has a cut-away side view section that includes a front face 51a with a hexagonal off-set cavity or opening 52 of a first diameter that receives the hexagonal coupling nut 57 and the threaded inlet 59 therein. Also, the off-set cavity or opening 52 has an internal back wall portion 52a and a second diameter opening 53 extending from the internal back wall portion 52a through the rough-in sleeve 51 to a rear end surface 51b thereof. At the entrance of the opening 53, dotted line 53a represents the outer back side of the cylindrical rough-in sleeve member 51 and the dotted line 53b at the end of opening 53 represents the outer back side of the cylindrical rough-in sleeve 51 at the rear end surface 51b.

Additionally, the inlet water supply pipe 56 extends through the second diameter opening 53 with a first end removably attached to the threaded coupling nut 57 and the other end that extends beyond the rear end surface 51b is attached to a "T" fitting 47 of the main water supply line 48 of the water distribution supply pipeline assembly 46 as described in FIG. 14C above. Note that the rough-in sleeve member 51 can have a loose-like frictional fit with the water supply pipe 56 or it can be soldered or welded thereto to retain the combination unit 50 relative to the water supply pipe 56, if desired. Other types of securing means, such as screw means, adhesives, epoxy or glue, to name just a few, can be utilized to retain the combination unit relative to the water supply pipe 56, if desired. This Figure operates in the same manner as the water stop valve devices and rough-in sleeve combination units 35, 40 as described in FIGS. 14-14C above.

Turning now to FIG. 16, which is very similar to the combination unit 50 of FIG. 15 as described above except for the following differences. First, the off-set cavity or opening 52 is cylindrical rather than hexagonal. Next, the inlet 57' of the valve body housing 58 has a cylindrical threaded interior end (not shown) to receive a threaded inlet end (not shown) of the water supply pipe 56. Also, these ends may be soldered or welded together or various other types of fastening means may be utilized that is obvious to one of ordinary skill in the art, at the time the invention was made, if desired. This Figure operates in the same manner as the water stop valve device and rough-in sleeve member combination units 35, 40 as described in FIGS. 14-14C above. Note that the remaining reference numerals in FIG. 16 will not be described, since they are the same as the like reference numerals as described above in FIG. 15.

FIG. 17 merely depicts the front view of FIG. 15 with the front face 51a, the hexagonal off-set opening 52 and the cylindrical through opening 53.

FIG. 17a depicts the front view of FIG. 16 with the front face 51a, the cylindrical off-set opening 52 and the cylindrical through opening 53.

FIG. 18 shows a rear view of FIGS. 15 and 16 with the rear end surface 51b and the cylindrical through opening 53.

Furthermore, the water supply pipe 56 and the water supply pipe or hose 62 may be selected of a material from any one of the groups that consist of copper, cross-linked polyethylene (PEX), aluminum plastic composite (APC), corrugated stainless steel tubing (CSST), polyvinyl chloride (PVC) or chlorinated polyvinyl chloride (CPVC), if desired. Note that other types of materials from other groups not mentioned above may be selected there from, if it is found to be beneficial. In addition, all the valve components can be selected from either one or any combination of the aforementioned materials, as well different types of metals, and any other types of materials that are deemed beneficial.

It may also be understood that the present invention may provide a valve system for fluids other than water and may be used in locations wherever a water stop valve device for a fluid distribution system is desired.

The exemplary embodiments of the present invention have been described with reference to the preferred drawing figures. Obviously, modifications and alterations will occur to others upon reading and understanding the preceding detailed description. It is intended that the exemplary embodiments be construed as including all such modifications and alterations insofar as they come within the scope of the appended claims or the equivalent thereof.

What is claimed is:

1. A new and improved water stop valve assembly utilized in new and remodeling building construction comprising:
   a water stop valve device having an inlet, an outlet, and a valve handle actuating device having at least a valve handle member that establishes open and closed positions for controlling fluid flow between the inlet and the outlet;
   a water distribution T-shaped fitting attached to a main water supply line;
   an inlet water pipe having a first end attached to the T-fitting and a second end attached to the inlet of the water stop device;
   a water fixture device having a pipe hose member attached to the outlet of the water stop valve device to receive selective fluid flow thereto upon actuation of the valve handle actuating device; and
   a substantially cylindrical rough-in sleeve member having an opening disposed within a front face thereof that is off-set relative to a central axis of the rough-in sleeve member, the rough-in sleeve member off-set opening further includes first and second diameter portions, at least the first diameter portion is removably and slidably disposed directly about at least a portion of the inlet end of the water stop valve device, a wall structure means having a hole cut therein so that it can slide over the entire water stop valve device and guided along and over an entire outer circumference of the rough-in sleeve member without any interference, while simultaneously allowing the wall structure means to always be supported about the outer circumference of the rough-in sleeve member.

2. The new and improved water stop valve assembly according to claim 1, wherein the outer circumference of the rough-in sleeve member includes an outer surface that defines a selective dimension within the outer surface so that when the at least a portion of the water stop valve is received in the at least first diameter portion, the water stop valve device having at least a remaining portion that is always positioned within the selective dimension of the rough-in sleeve member exteriorly of a front face surface thereof to easily install the wall structure means defining a vanity or cabinet having a hole cut therein for sliding it over the entire water stop valve device and the entire outer circumference of the rough-in sleeve member and into abutting engagement with the wall structure means, while at the same time being supported about the rough-in sleeve member after complete installation.

3. The new and improved water stop valve assembly according to claim 1, wherein the off-set opening first diameter portion having an internal annular rim wall portion at a selective depth therein defined by the distance from the front face surface to the internal annular rim wall portion to receive the at least the inlet end portion of the water stop valve device therein with a front end portion thereof in abutting engagement with the annular rim wall portion, the second diameter portion extends from the internal annular rim wall portion to a back wall rim portion, the inlet end of the water stop valve device securely receives at least a portion of the inlet water pipe therein and the second diameter opens into a major cavity that extends a specified distance between the back wall rim portion and a rear end rim wall portion of the rough-in sleeve that receives a major length of the inlet water pipe therein.

4. The new and improved water stop valve assembly according to claim 1, wherein the wall structure means includes a sheet of drywall having a hole cut therein that is approximate an outer cylindrical diameter of the rough-in sleeve member, so that the drywall can be easily installed over the entire water stop valve device and along an outer cylindrical surface of the rough-in sleeve member via the hole within the drywall when the valve handle member has been detached, which is a direct result of the selective positioning of the water stop valve device within the off-set opening in the rough-in sleeve member.

5. The new and improved water stop valve assembly according to claim 1, wherein the off-set opening first and second diameter portions are disposed within a front surface area of the rough-in sleeve member.

6. The new and improved water stop valve assembly according to claim 1, wherein the rough-in sleeve member includes a pair of semi-circular halves with each having semi-circular complimentary edges on one end thereof defining an integral hinge means there between and the other edges on the other ends of the semi-circular halves having complimentary fastening means disposed thereon.

7. The new and improved water stop valve assembly according to claim 6, wherein the pair of semi-circular halves include an upper semi-circular member and a lower semi-circular member, the upper semi-circular member having a pair of opposite side underneath L-shaped outer edge surfaces, the lower semi-circular having a pair of opposite side upper L-shaped outer edge surfaces, the hinge means is defined by an integral surface extending between one of the underneath L-shaped outer edge surfaces and one of the upper L-shaped outer edge surfaces that forms a hinge connection along substantially the entire length thereof.

8. The new and improved water stop valve assembly according to claim 7, wherein the complimentary fastening means includes a plurality of fastening projections extending from and along the other underneath L-shaped outer edge surface opposite the hinge connection and a plurality of complimentary apertures disposed on and along the other upper L-shaped outer edge surface opposite the hinge means for matingly inserting the complimentary fastening projections into the complimentary apertures to move the rough-in sleeve about the at least a portion of the water stop valve device from a hinged open position to a hinged closed position, the hinge means is further defined by cooperating mechanical hinge elements disposed along the underneath and upper L-shaped outer edges opposite the underneath and upper outer edges with the plurality of fastening projections and complimentary apertures.

9. The new and improved water stop valve assembly according to claim 7, wherein each of the L-shaped outer edge surfaces of the semi-circular halves having a long leg portion and a short leg portion that is perpendicular thereto, the long leg portion having a diameter that is equal to an outer peripheral diameter rim wall portion of a rear end of the semi-circular halves and the short leg portion having a thickness that defines an internal wall rim portion on one side and a back wall rim portion on the other side with a second off-set smaller diameter opening being formed there through.

10. The new and improved water stop valve assembly according to claim 7, wherein each of the semi-circular halves include a front face portion with an off-set semi-circular opening of a first diameter extending from the front face portion to a selective depth to an internal wall rim portion, the semi-circular halves having an outer peripheral diameter rim wall portion at rear ends thereof that defines a cavity of a major diameter that extends a selective distance from the semi-circular rear ends to back wall rim portions of the cavity on an opposite side to the internal wall rim portions, and a second smaller off-set semi-circular diameter opening of each semi-circular halves that extends through the internal wall rim portions and the back wall rim portions of the cavity.

11. The new and improved water stop valve assembly according to claim 1, wherein the off-set opening in the rough-in sleeve member has a hexagonal shape, the water inlet pipe second end has a hexagonal threaded coupling nut disposed thereon, the water stop valve device inlet has a threaded portion thereon, wherein the threaded coupling nut is threaded on the water stop valve device threaded inlet for securing the water stop valve device to the water inlet pipe second end.

12. The new and improved water stop valve assembly according to claim 1, wherein the off-set opening in the rough-in sleeve member has a cylindrical shape, the water inlet pipe second end being disposed and secured within the water stop valve device inlet by various types of fasteners there between from any one of the groups that consist of threaded means, soldering, welding and mechanical clamp means.

13. The new and improved water stop valve assembly according to claim 1, wherein the valve handle member is removably attached to an operating valve stem that moves between the open and closed positions for controlling fluid flow between the inlet and the outlet of the water stop valve device, a valve stem packing nut being disposed about the operating valve stem to prevent fluid leakage thereabout, a top portion of the valve stem having a plurality of projections and grooves thereon defining a first spline connection, the valve handle member having a plurality of projections and grooves disposed in a centrally located socket extension member on a rear surface face defining a second spline connection for matingly aligning and centering the projections and grooves of the second spline connection of the valve handle member with and about the projections and grooves of the first spline connection of the valve stem, the valve handle member further includes a retaining screw hole in a front face surface through a central portion thereof via the centrally located socket extension member and the top of the valve stem further include a central opening that aligns with the screw hole in the front face surface for receiving a screw member for securing the valve handle member to the valve stem via the socket extension member.

14. The new and improved water stop valve assembly according to claim 4, wherein the water stop valve assembly includes a vanity or cabinet having a hole in a back wall portion that is approximate the outer cylindrical diameter of the rough-in sleeve member, the vanity or cabinet can be easily installed over the entire water stop valve device and along the outer cylindrical surface of the rough-in sleeve member via the hole within the vanity or cabinet back wall portion until it abuts and is secured against the drywall after the valve handle member has been detached.

15. The new and improved water stop valve assembly according to claim 14, wherein a trim ring has a diameter that is of a dimension that is approximate the outer cylindrical diameter of the rough-in sleeve member, the trim ring has at least one set screw retaining hole for receiving at least one set screw member at least at a selective surface thereon, the trim ring being slidably inserted over the entire water stop valve device and along the outer cylindrical surface of the rough-in sleeve member, so that the trim ring can be secured to the rough-in sleeve member by screwing the at least one set screw member into the at least one screw hole until it engages the rough-in sleeve member for hiding any imperfections in the hole within the vanity or cabinet and the hole in the drywall.

16. The new and improved water stop valve assembly according to claim 15, wherein the trim ring includes at least a pair of set screw retaining holes and at least a pair of set screw members that are received therein, the at least a pair of retaining holes may be positioned at a bottom and a top surface of the trim ring, so that the trim ring can be secured to the rough-in sleeve member by screwing the at least a pair of set screw members into the at least a pair of set screw retaining holes until they engage the outer cylindrical surface of the rough-in sleeve member.

17. The new and improved water stop valve assembly according to claim 1, wherein the water inlet pipe, the water fixture pipe hose member, and the water stop valve device components can be selected from a material of any one of the groups that consist of various metals, copper, cross-linked polyethylene (PEX), aluminum plastic composite (APC), corrugated stainless steel tubing (CSST), polyvinyl chloride (PVC) or chlorinated polyvinyl chloride (CPVC) and any combination of the selected groups of materials.

18. A new and improved water stop valve assembly connected to a water distribution system comprising:
   a main water distribution pipeline;
   a water stop valve device having an inlet, an outlet, and a valve handle device for actuating the water stop valve device between open and closed positions for controlling fluid flow between the inlet and the outlet;
   a water distribution T-shaped or L-shaped fitting attached to the main water distribution pipeline;
   an inlet water pipe having a first end attached to the T-shaped or L-shaped fitting and a second end attached to the inlet of the water stop device;
   a water fixture device being attached to the outlet of the water stop valve device to receive selective fluid flow thereto upon actuation of the valve handle device; and
   a substantially cylindrical rough-in sleeve member having an opening that is off-set relative to a central axis of the rough-in sleeve member in a front face thereof for slidably receiving and securing it about at least a portion of the water stop valve device at the inlet thereof, the off-set opening being selectively positioned such that the water stop valve device is always within an outer circumference of the rough-in sleeve member, wherein the rough-in sleeve member being of a selective diameter that will allow an opening in at least one of a sheet of drywall, vanity or cabinet having a diameter substantially the size of the diameter of the rough-in sleeve member to slide along and over the entire water stop valve device and the rough-in sleeve member without any interference because of the positioning of the off-set opening and the least one of a sheet of drywall, vanity or cabinet is always supported about the rough-in sleeve member.

19. A method of quickly and easily attaching a new and improved water stop valve assembly to a main water distribution piping system without post installation of water stop valves, re-sweating blocking end caps, turning a main water supply on and off multiple times and without plumbers having to lie on their backs in cramped spaces, such as underneath cabinets or vanities, crawl spaces and small utility areas to install the water stop valves, drying and re-sweating, soldering or welding pipe joints, pipe lines and valve connections, the water stop valve assembly comprising:
   providing a main water supply line with either one of a T-shaped or L-shaped fitting attached thereto;
   providing a water stop valve device having an inlet, an outlet, and a valve handle actuating device having at least a valve handle member that establishes open and closed positions for controlling fluid flow between the inlet and the outlet;
   providing an inlet water pipe having a first end attached to the T-shaped or L-shaped fitting and a second end attached to the inlet of the water stop device;
   providing a water fixture device having a pipe hose member attached to the outlet of the water stop valve device to receive selective fluid flow thereto upon actuation of the valve handle actuating device; and
   providing a substantially cylindrical rough-in sleeve member having an opening within a front face surface that is positioned offset from a central axis of the rough-in sleeve member so that the water stop valve device is positioned therein so that it is always at a selected dimension within the entire outer circumference of the rough-in sleeve member, the rough-in sleeve member having first and second diameter portions, the first diameter portion being removably secured directly about at least a portion of the inlet of the water stop valve device, the second end of the inlet water pipe is secured to the inlet of the water stop valve device with a portion disposed within the first diameter portion and at least a portion of the inlet water pipe that is disposed between the first and second ends of the water pipe that is received in the second diameter portion defining a single water stop valve unit.

20. The method of quickly and easily attaching the new and improved water stop valve assembly to the main water distribution piping system according to claim 19, further comprising the steps of:
   providing a sheet of drywall having a hole therein that is substantially the same diameter as the outer diameter of the rough-in sleeve member, the drywall is then installed by sliding it over the entire water stop valve device and the rough-in sleeve member for enclosing the main water supply line, the attached T-shaped or L-shaped fitting and the inlet water pipe;
   providing a vanity or cabinet having a hole disposed in a back wall portion that is substantially the same diameter as the outer diameter of the rough-in sleeve member, the vanity or cabinet wall portion is then installed by sliding it over the entire water stop valve device and the rough-in sleeve member and into abutting engagement with the drywall; and providing a trim ring with an opening that is substantially the same diameter as the outer circumference of the rough-in sleeve member, the trim ring is then installed by sliding it over and along the entire water stop valve device and the rough-in sleeve member and into abutting engagement with an inside wall surface of the back wall portion of the vanity or cabinet, the trim ring having at least one set screw retaining aperture therein and a set screw member that is screwed therein and into abutting engagement with an outer surface of the rough-in sleeve member for retaining it in place, while hiding any imperfections in the holes of the drywall and the back wall portion of the vanity or cabinet, wherein the positioning of the water stop valve device within the selective positioned offset opening is always within the entire outer circumference of the rough-in sleeve member exteriorly of a front face surface thereof to allow the drywall, the vanity or cabinet and trim ring to slide completely over the water stop valve device and the rough-in sleeve member being supported thereabout without any interference when the valve handle member is detached.

* * * * *